(12) United States Patent
Benoit et al.

(10) Patent No.: US 10,618,205 B2
(45) Date of Patent: Apr. 14, 2020

(54) METHOD FOR PRODUCING PARTS (71) Applicant: Groupe JBT, Molinges (FR)

(72) Inventors: Jean Benoit, Chassal (FR); Dominique Malfroy, Longchaumois (FR); Laurent Lavina, Thoiria (FR)

(73) Assignee: Groupe JBT (FR)

( * ) Notice: Subject to any disclaimer, the term of this patent is extended or adjusted under 35 U.S.C. 154(b) by 35 days.

(21) Appl. No.: 15/117,992

(22) PCT Filed: Feb. 11, 2015

(86) PCT No.: PCT/EP2015/052901
§ 371 (c)(1),
(2) Date: Aug. 10, 2016

(87) PCT Pub. No.: WO2015/121320
PCT Pub. Date: Aug. 20, 2015

(65) Prior Publication Data
US 2017/0008204 A1 Jan. 12, 2017

(30) Foreign Application Priority Data

Feb. 11, 2014 (FR) ...................... 14 00379

(51) Int. Cl.
*B29C 45/04* (2006.01)
*B29C 45/16* (2006.01)
(Continued)

(52) U.S. Cl.
CPC ............ *B29C 45/04* (2013.01); *B29C 45/006* (2013.01); *B29C 45/1618* (2013.01);
(Continued)

(58) Field of Classification Search
CPC ... B29C 45/04; B29C 45/006; B29C 45/1618; B29C 45/32; B29C 45/7207; B29C 45/1615; B29C 45/1675
See application file for complete search history.

(56) References Cited

U.S. PATENT DOCUMENTS 7,150,845 B1 * 12/2006 Gram .................... B29C 45/045
264/254
7,627,950 B2 * 12/2009 Derouet ................ B29C 45/006
29/890.143
(Continued)

FOREIGN PATENT DOCUMENTS

DE 102007051701 A1 * 5/2009 ............. B29C 33/58
JP 61089014 A * 5/1986 ............. B29C 45/06
(Continued)

OTHER PUBLICATIONS

Haoyu Xu & David Kazmer, A stiffness Criterion for Cooling Time Estimation, 14 Int'l Polymer Processing Journal of the Polymer Processing Soc'y 103 (Year: 1999).*
(Continued)

*Primary Examiner* — Christopher M Koehler
*Assistant Examiner* — Kyle A Cook
(74) *Attorney, Agent, or Firm* — Lerner, David, Littenberg, Krumholz & Mentlik, LLP (57) ABSTRACT

A method for producing parts from polymer in a mould comprising first and second mould portions that can be moved relative to each other, comprising: —closing (202) the mould in order to form a first injection cavity connected to an injection device by the first mould portion, —injecting (204) material into the first injection cavity in order to form a first part, —moving (206) one of the mould portions relative to the other, the first part remaining connected to the second mould portion, —closing (208) the mould to form: a second injection cavity connected to the injection device by
(Continued)

the first mould portion, and a first solidification cavity in which the first part is disposed, —injecting (210) material into the second injection cavity to form a second part and simultaneously solidifying the first part disposed in the first solidification cavity.

18 Claims, 6 Drawing Sheets

(51) Int. Cl.
*B29C 45/00* (2006.01)
*B29C 45/32* (2006.01)
*B29C 45/72* (2006.01)
*B29K 101/10* (2006.01)
*B29K 101/12* (2006.01)
*B29L 31/00* (2006.01)

(52) U.S. Cl.
CPC .......... *B29C 45/32* (2013.01); *B29C 45/7207* (2013.01); *B29K 2101/10* (2013.01); *B29K 2101/12* (2013.01); *B29L 2031/7544* (2013.01)

(56) References Cited

U.S. PATENT DOCUMENTS

| | | | | |
|---|---|---|---|---|
| 2004/0033287 | A1* | 2/2004 | Gram | B29C 45/006 425/515 |
| 2010/0244314 | A1* | 9/2010 | Kato | B29C 45/1628 264/255 |
| 2014/0332991 | A1* | 11/2014 | Giessauf | B29C 45/1618 264/1.7 |

FOREIGN PATENT DOCUMENTS

| | | | | |
|---|---|---|---|---|
| JP | 06182806 | A * | 7/1994 | ......... B29C 45/0062 |
| JP | 10175230 | A * | 6/1998 | ......... B29C 45/0062 |
| WO | 0073040 | A1 | 12/2000 | |
| WO | WO 2014205093 | A2 * | 12/2014 | .......... A61M 15/085 |

OTHER PUBLICATIONS

International Search Report for Application No. PCT/EP2015/052901 dated Mar. 20, 2015.

Rief B., "Mehr Farbe Und Funktion", Kunstoffe, Carl Hanser Verlag, Munchen, DE, vol. 93, No. 6, Jun. 1, 2003, pp. 20-22,24,26, XP001153845 (English translation of Abstract is provided herewith.).

* cited by examiner

METHOD FOR PRODUCING PARTS

CROSS REFERENCE TO RELATED APPLICATIONS

The present application is a national phase entry under 35 U.S.C. § 371 of International Application No. PCT/EP2015/052901, filed Feb. 11, 2015, which claims priority from French Patent Application No. 1400379, filed Feb. 11, 2014, the disclosures of which are incorporated by reference herein.

FIELD OF INVENTION

The invention concerns a method for producing parts in polymer and an associated system. The invention particularly concerns the large mass production of such parts.

STATE OF THE ART

With reference to FIGS. 1A to 1D, a method for producing polymer parts by injection can be performed in a mould 100 comprising a fixed mould portion 101 and movable mould portion 102.

Figure 1A:
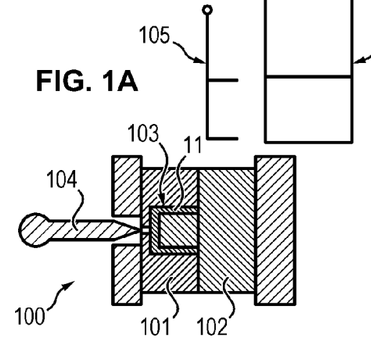
FIGS. 1A to 1D schematically illustrate views of a system to produce parts in the state of the art and using a prior art method.

The mould 100 is first closed to form a cavity connected via the fixed mould portion to a device 104 for the injection of material.

As illustrated in FIG. 1A, material is then injected into the cavity 103 to form a first part 11. The mould 100 is held closed until the part 11 thus formed is fully solidified and is able to be ejected from the mould 100.

Figure 1B:
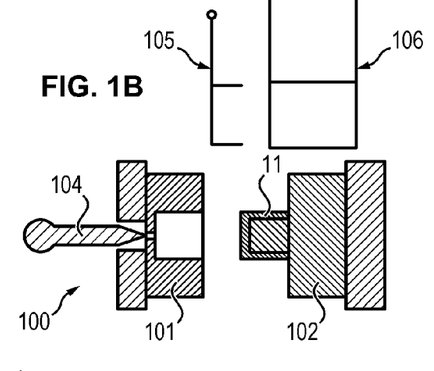

As illustrated in FIG. 1B, the mould 100 is then opened.

Figure 1C:
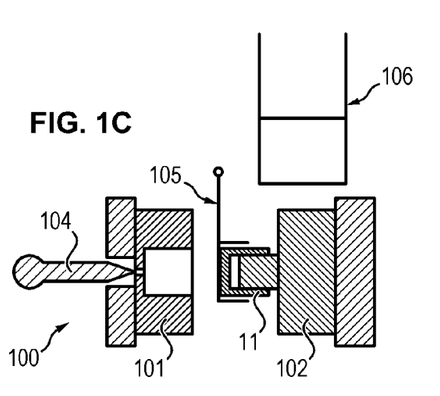

As illustrated in FIG. 1C, the solidified part 107 is then ejected and taken in charge by a robot 105.

Figure 1D:
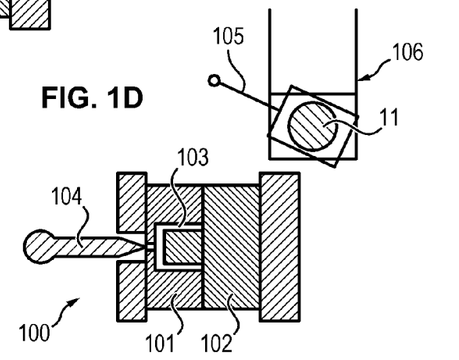

As illustrated in FIG. 1D, the robot 105 conveys the part 11 to an evacuation station 106 where it can be evacuated. Simultaneously, the mould 100 is closed to allow further injection of material.

In general, parts of small size and narrow thickness, such as parts for medical use lend themselves easily to formation by injection which allows short cycle times with reduced tooling volume and hence high productivity.

Tooling volume is a determinant factor on account of the structural cost of controlled environment zones (particles and bioburden) that are required for several types of production e.g. the production of parts for medical use.

For example, parts intended to be assembled together can be produced on similar equipment operating in parallel for subsequent assembly.

On the other hand, in some cases certain parts, typically thicker parts, require long solidification cycle times. These parts are therefore produced using multi-cavity tooling of large size to allow the large mass production of parts thereby increasing the relative unit cost of parts of this type.

In some situations, two parts of dissymmetrical thickness are to be produced in equal quantities for subsequent assembling together.

To avoid or at least limit intermediate storage, it is then necessary to provide tooling of much larger volume for one of the parts, even tooling in larger quantity to be able to produce equal quantities of parts simultaneously.

It is at times necessary to ensure intermediate storage of parts of narrow thickness followed by their redistribution for assembly thereof with parts of greater thickness which are manufactured at slower production rates.

Regarding parts for medical use, it is preferable however to avoid the intermediate storage of parts which requires additional packaging (double wrap, storage under controlled atmosphere, related costs . . . ) and handling with the risk of increasing the initial contamination of parts before sterilization, as mentioned above.

In addition, any additional handling leads to risks of accidental mixing between parts and makes more complex the essential requirement of traceability of parts for pharmaceutical and medical use.

SUMMARY OF THE INVENTION

It is one objective of the invention to overcome these disadvantages. One particular objective of the invention is to propose a method and system to produce parts via injection allowing implementation of the production of parts of different geometries that are to be assembled, this production being rapid whilst limiting the bulk of the tooling needed for production.

For this purpose, according to a first aspect, the subject of the present invention is a method for producing polymer parts in a mould comprising a first mould portion and a second mould portion movable relative to one another, the method comprising the steps of:

closing the mould in a first position in which the two mould portions form at least a first injection cavity connected via the first mould portion to a material injection device, injecting material into the first injection cavity to form a first part, moving one of the mould portions relative to the other, the first part remaining connected to the second mould portion, closing the mould in a second position, in which the two portions form:
  at least a second injection cavity connected via the first mould portion to the material injection device, and
  a first solidification cavity in which the first part is placed, injecting material into the second injection cavity to form a second part in the second injection cavity and simultaneously solidifying the first part placed in the first solidification cavity.

It is therefore possible to obtain rapid frequency of parts which nevertheless require a longer solidification time. In particular, it is possible to obtain said frequency using simple tooling that takes up little space.

In addition it is thus possible to limit even further, and even to avoid, any intermediate storage of parts having a shorter solidification time with which the parts of longer solidification time must be subsequently assembled.

In particular it is then possible to produce parts intended to be paired together in equal quantities with tooling of small dimensions, producing parts simultaneously and limiting subsequent handling due to intermediate storage.

The invention according to the first aspect is advantageously completed by the following characteristics taken alone or in any possible technical combination:

the relative movement between the two mould portions comprises a rotation so as to bring the first ejection zone to face the solidification zone and the second ejection zone to face the injection zone;

the first mould portion comprises a plurality of injection zones and a plurality of solidification zones, and the second mould portion comprises a plurality of ejection zones;

the material is:
- a thermoplastic material, the solidification of the first part is performed by cooling the material; or
- a thermosetting material, the solidification of the first part is performed by applying energy to the material, typically by heating;

the first part is produced by a single-material injection moulding machine;

ejecting the first solidified part.

According to a second aspect, the present invention further concerns a method for producing parts formed of at least two elements, wherein the method comprises:
- producing a first element using a method such as described above,
- simultaneously, producing a second element in a second mould, the second element having a shorter solidification time than the first element, and
- assembling the first element and the second element.

According to the second aspect, the invention can be completed by the characteristic according to which a portion of the second mould is movable and secured to the second mould portion of the first element.

According to a third aspect, the invention also concerns a system for the production of polymer parts to implement a production method such as just described.

BRIEF DESCRIPTION OF THE FIGURES

Other characteristics and advantages of the invention will become apparent from the following description that is non-limiting, solely given for illustration and is to be read in connection with the appended drawings in which:

FIGS. 4A1 to 4D1 schematically illustrate views of a mould in a system to produce parts according to one example of embodiment of the invention using a method according to another example of embodiment of the invention;

FIGS. 4A2 to 4D2 schematically illustrate views, corresponding to FIGS. 4A1 to 4D1, of a second mould in the same system;

FIGS. 5A1 to 5E1 schematically illustrate views of a system to produce parts according to one example of embodiment of the invention using a method according to another example of embodiment of the invention;

FIGS. 5A2 to 5E2 schematically illustrate views, corresponding to FIGS. 5A1 to 5E1, of a second mould portion in the same system.

DETAILED DESCRIPTION OF THE INVENTION

System

General Description of an Example of a System

With reference to FIGS. 4A1 to 4D2 and 5A1 to 5E2, a system is described to produce polymer parts.

By polymer part is meant both a part comprising a single type of polymer and comprising different types of polymers.

The system is adapted to implement a method such as later described.

The system comprises a mould 40. The mould typically comprises a first mould portion 401 and a second mould portion 402.

The two mould portions 401 and 402 are movable relative to one another. The system is typically adapted to allow the movement of one of the mould portions 401 or 402 relative to the other.

For example the first mould portion 401 is fixed, typically fixed relative to a body of the production system or relative to the reference system of the room in which the system is arranged, the second mould portion 402 then being movable. Alternatively, the second mould portion 402 can be fixed, typically fixed relative to a body of the production system or relative to the reference system of the room in which the system is arranged, the first mould portion 401 then being movable. Alternatively both mould portions 401 and 402 can be movable, typically movable in respect of each other and each movable relative to a body of the production system or relative to the reference system of the room in which the system is arranged.

Figure 4A:
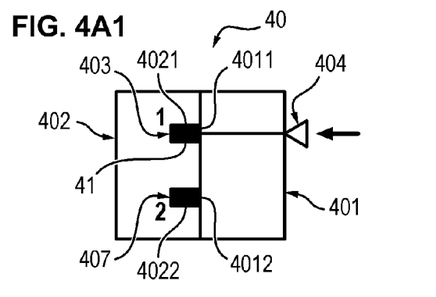
Figure 5A:
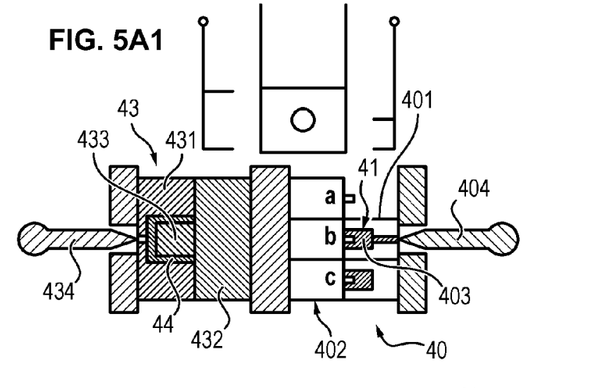
Figure 5A:
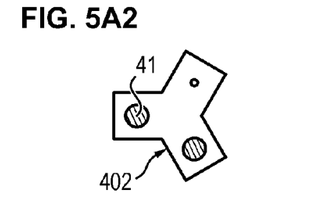

The mould 40 is typically adapted to be closed in a first position, illustrated in FIGS. 4A1, 5A1 and 5A2 for example. In this first position, the two mould portions 401 and 402 typically form at least a first injection cavity 403.

The first injection cavity 403 is typically connected to a matter or material injection device 404, for example via the first mould portion 401. The mould 40 is therefore typically adapted to allow the injection of material into the first injection cavity 403 to form a first part 41.

The material is typically a polymerisable material, adapted to solidify into a polymer material.

The system is typically configured to move one of the mould portions relative to the other so that the first part 41 remains connected to the second mould portion 402. This is made possible for example by the shapes of the mould 40, in particular at the zones allowing the first injection cavity 403 to be formed.

Figure 4A:
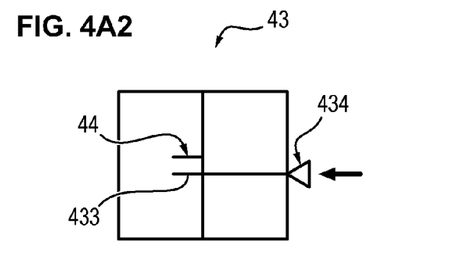
Figure 4B:
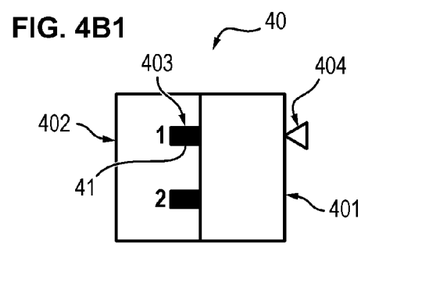
Figure 4B:
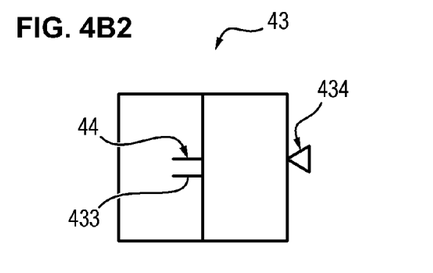
Figure 4C:
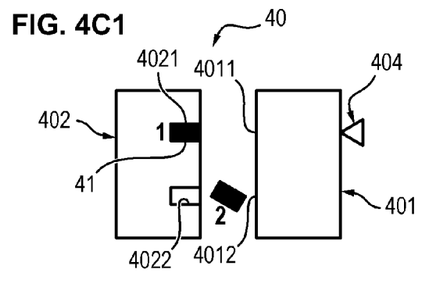
Figure 4C:
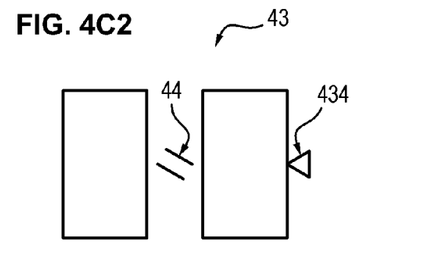
Figure 4D:
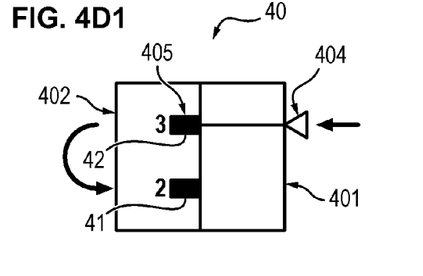
Figure 5B:
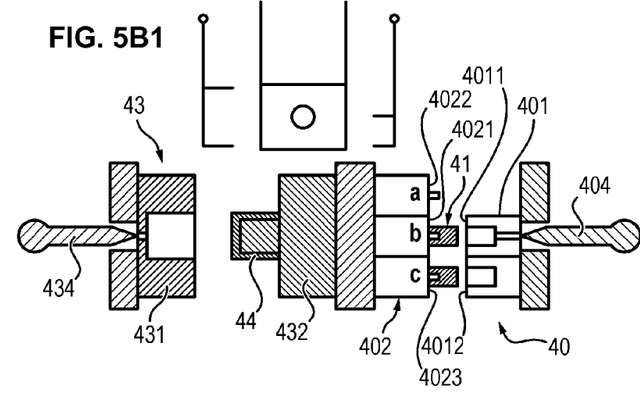
Figure 5B:
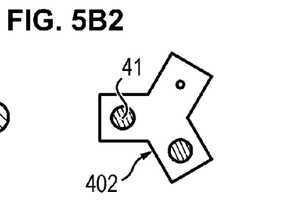
Figure 5C:
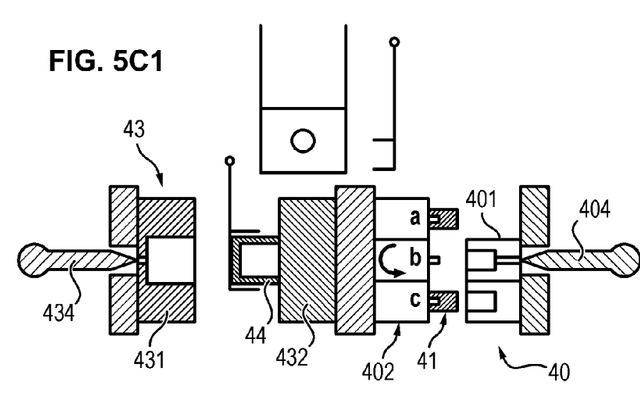
Figure 5C:
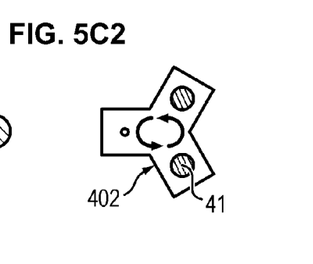
Figure 5D:
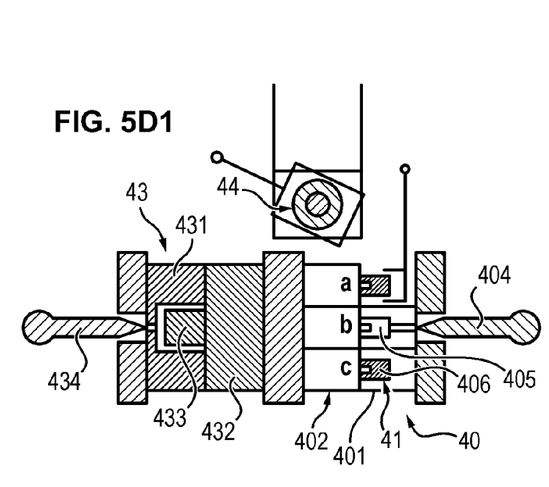
Figure 5D:
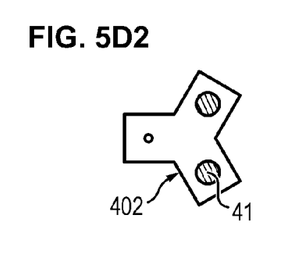

The mould is typically adapted to be closed in a second position illustrated in FIGS. 4D1, 5D1 and 5D2 for example.

In this second position the two mould portions 401 and 402 typically form at least a second injection cavity 405.

The second injection cavity 405 is typically connected to the material injection device 404, for example via the first mould portion 401. The mould 40 is therefore typically adapted to allow the injection of material into the second injection cavity 405 to form a second part 42.

In this second position, the two mould portions mould 401 and 402 typically form a first solidification cavity 406 in which the first part 41 is placed.

The system is typically configured to allow injection of material into the second injection cavity 406 to form a second part 42 in the second injection cavity and simultaneously to solidify the first part 41 placed in the first solidification cavity 406.

Mould Zones

The first mould portion 401 may comprise at least an injection zone 4011 and at least a solidification zone 4012. The second mould portion 402 may comprise a first ejection zone 4021 and a second ejection zone 4022. Such examples of zones are given in FIGS. 4A1 to 4D1 and 5A1 to 5E1.

These zones typically correspond to moulding cavities or moulding areas i.e. reliefs or hollows on the mould surface which when associated allow substantially closed cavities to be formed. The cavities are typically closed against the material which is typically injected in liquid or substantially liquid form, but adapted to allow the air initially contained in the cavity to escape during injection.

These zones of the two mould portions 401 and 402 can be configured so that in the first position the injection zone 4011 and the first ejection zone 4021 form the first injection cavity 403.

Also, these zones of the two mould portions 401 and 402 can be configured so that in the first position the solidification zone 4012 and the second ejection zone 4022 form a second solidification cavity 407. An example of this configuration is illustrated FIG. 4A1.

Alternatively, these zones of the two mould portions 401 and 402 can be configured so that in the first position the second ejection zone is positioned so as to allow the ejection of an already solidified part connected to the second ejection zone. Examples of said configuration are illustrated for example in FIGS. 5A1 and 5D1.

These zones of the two mould portions 401 and 402 can be configured so that in the second position the injection zone 4011 and the second ejection zone 4022 form the second cavity 405. Examples of said configurations are given in FIGS. 4D1 and 5D1.

In addition, these zones of the two mould portions 401 and 402 can be configured so that in the second position the solidification zone and the first ejection zone form the solidification cavity. Examples of said configurations are given in FIGS. 4D1 and 5D1.

In particular, the relative movement of the two mould portions may comprise a rotation. For example, this rotation allows to move the first ejection zone 4021 in front of the solidification zone 4012 and the second ejection zone 4022 in front of the injection zone 4011.

It is thus possible to move a surface-solidified part from an injection cavity towards a solidification cavity, so as to allow the forming of another part by injection while solidification of the already-formed part is completed.

This provides for simple implementation of a method allowing an increase in the frequency of part production and in particular the coupling thereof with a method for producing parts having faster solidification time, so that they can subsequently be assembled without having to provide temporary storage of parts which solidify more quickly.

These zones as typically arranged at the connection surfaces of the two mould portions 401 and 402, these surfaces typically forming a plane called a parting line when the mould 40 is closed.

In particular, the first mould portion 401 may comprise a plurality of injection zones and a plurality of solidification zones, and the second mould portion 402 may comprise a plurality of ejection zones. It is thus possible to improve further the frequency of the production of parts.

In particular, the second mould portion 402 may comprise at least a eject mechanism to eject a cooled part. The eject mechanism is arranged for example at each ejection zone.

Method

Method for Producing Parts

Figure 2:
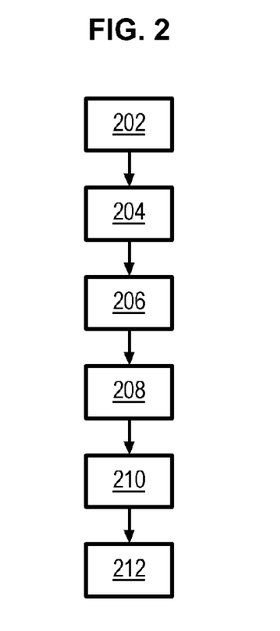
FIG. 2 schematically illustrates a method for producing polymer parts according to one example of embodiment of the invention.

With reference to FIG. 2 a method is described to produce polymer parts.

The method is typically implemented using a system such as described in the foregoing.

The parts are formed in a mould 40. The mould 40 typically comprises a first mould portion 401 and a second mould portion 402.

The two mould portions 401 and 402 are movable relative to one another.

For example, the first mould portion 401 is fixed, typically fixed relative to a body of the production system or relative to reference system of the room in which the system is arranged, the second mould portion 402 then being movable. Alternatively, the second mould portion 402 may be fixed, typically fixed relative to a body of the production system or relative to the reference system of the room in which the system is arranged, the first mould portion 401 then being movable. Alternatively, both mould portions 401 and 402 may be movable, typically movable relative to each other and each movable relative to a body of the production system or relative to the reference system of the room in which the system is arranged.

The method comprises a first step of closing 202 the mould 40 in a first position, illustrated in FIGS. 4A1, 5A1 and 5A2 for example. In this first position, the two mould portions 401 and 402 form at least a first injection cavity 403.

The first injection cavity 403 is typically connected to a matter injection device or material injection device 404, e.g. via the first mould portion 401. The mould 40 is therefore typically adapted to allow injection of the matter or material in the first injection cavity 404 to form a first part 41.

The method comprises a second step of injecting 204 matter or material into the first injection cavity 403 to form a first part 41.

The method comprises a third step of moving 206 one of the mould portions relative to the other, the first part 41 remained connected to the second mould portion 402.

The relative movement of the two mould portions 401 and 402 may comprise a rotation for example, typically to bring a first ejection zone 4021 opposite a solidification zone 4012, and a second ejection zone 4022 opposite an injection zone 4011, as previously described.

The relative movement of the two mould portions 41 and 42 is typically movement of the first mould portion 401 and/or second mould portion 402.

The method comprises a fourth step of closing 208 the mould in a second position. Examples of second position are given in FIGS. 4D1, 5D1 and 5D2.

In the second position, the two mould portions 401 and 402 form at least a second injection cavity 405. The second injection cavity 405 is typically connected to the material injection device 404, for example via the first mould portion 401.

In the second position, the two mould portions 401 and 402 also form a first solidification cavity 406 in which the first part 41 is placed.

The method comprises a fifth step of injecting 210 material into the second injection cavity 405 to form a second part 42 in the second injection cavity 405, and simultaneously to solidify the first part 41 placed in the first solidification cavity 406.

Therefore the movement of the mould portions 401 and 402 relative to one another, and hence the opening of the mould can take place at the earliest point in time at which the moulded part has sufficient resistance (surface solidification) to allow transfer thereof on the second mould portion 402 towards another zone of the first mould portion 401 allowing completion of the cooling or cross-linking phase.

It is thus possible to obtain rapid frequency of parts requiring a longer solidification time. In particular, it is possible said frequency using tooling that is simple and compact.

Also, a thick part requires a long solidification time, hence a long production cycle time. Said thick part may be intended to be paired with a thinner plastic part requiring a relatively short production cycle time compared with the production cycle of the thicker part.

Therefore by means of the method and system described above, a thick part is given an additional solidification time during the production time of thin parts, through transfer of the part for solidification to the solidification cavity 406.

It is hence possible to further limit, even avoid, any intermediate storage of parts having a shorter solidification time with which the parts produced in this manner will be subsequently assembled.

With the method it is therefore possible to limit handling of the parts during their manufacture. The method is therefore particularly adapted to parts for medical and pharmaceutical use for which initial contamination i.e. contamination generated by manufacture is generally proportional to the number of handling operations and must be reduced to a minimum.

Such a method is particularly advantageous compared with a mould solely having injection cavities in which each part must be held during the time needed for total solidification. In fact, such a of tooling is particularly bulky compared with the invention on account of the multiple cavity-feeding channels to allow injection of material into the mould cavities by the at least an injection device; and in addition said tooling would produce the entire series of parts at the same time, which would require handling of all the parts at the same time after solidification giving rise to complex tooling the dimensions of which would be further increased as compared with the invention in which it is possible to produce parts with greater frequency successively one after the other or in small amounts leading to simplified handling and involving more limited tooling.

In particular, the first part can be produced using a single-material injection moulding machine.

It is thus possible to conduct the manufacture of parts using simple, non-voluminous tooling. This is particularly advantageous compared with a co-injection moulding machine i.e. the injection of two different materials in which it must be waited until the part formed by the first injection is fully solidified before it is grasped by a robot and transferred to an injection zone of the second material to form the final part, and the part thus formed must be allowed to solidify completely after the second injection. Compared with the invention, the application of a co-injection method requires relatively costly injection machines since they have at least two injection units and complex moulds of large dimensions, whereas single-material moulding machines are less costly since they only have one injection unit, are standardised, are more common and therefore with wider commercial choice and are not specialised or specific machines in opposition to co-injection machines.

In addition, the method may comprise a sixth step of ejecting 212 the first solidified part. The solidified part is then typically taken in charge by a robot. As illustrated in FIGS. 5C1 5D1, the robot can convey the solidified part to an evacuation station from which it can be evacuated. Simultaneously the mould 40 can be re-closed to allow another injection of material.

Method for Producing Parts Formed of at Least Two Elements

Figure 3:
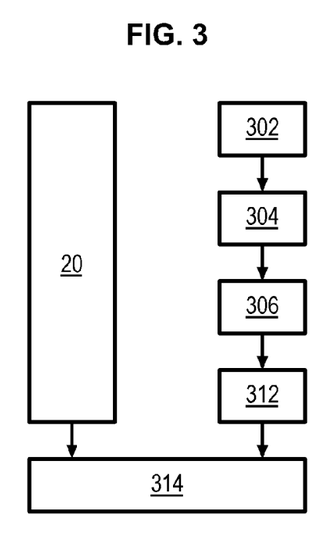
FIG. 3 schematically illustrates a method for producing parts formed of at least two elements according to another example of embodiment of the invention.

With reference to FIG. 3, a method is described to produce parts formed of at least two elements.

The method is typically implemented using a system such as described above.

The method may comprise a first step of producing a first element 20 using a method such as previously described. It is typically the method illustrated in FIG. 2.

These steps are typically illustrated in FIGS. 4A1 to 4D1 and 5A1 to 5E1 respectively.

The method may comprise a second step of producing simultaneously a second element in a second mould 43, the second element having a shorter solidification time than the first element.

The second mould 43 typically comprises a first portion 431 of the second mould and a second portion 432 of the second mould.

The second step typically comprises a first sub-step of closing 302 the second mould 43. In this position, the mould 43 forms at least an injection cavity 433. This step is typically illustrated in FIG. 5D1.

The injection cavity 433 is typically connected to a material injection device 434. The mould 43 is therefore typically adapted to allow the injection of material into the injection cavity 434 to form a second element 44.

The second step typically comprises a second sub-step of injecting 304 material into the injection cavity 433 to form a second element 44. This step is typically illustrated in FIGS. 4A2 and 4D2, and in FIGS. 5A1 and 5E1.

This second sub-step 304 typically comprises solidification of the second element 44 in the injection cavity 433 as illustrated in FIGS. 4B2 and 5A1.

The second step typically comprises a third sub-step of moving 306 one of the portions 431 or 432 of the second mould relative to the other, the second element 44 remaining connected to the second mould portion 432. The mould 43 is therefore opened as illustrated in FIGS. 4C2 and 5B1.

The second step may further comprise a sixth step of ejecting 312 the second solidified element. Said sub-step is typically illustrated in FIGS. 4C2 and 5C1. The second solidified element is then typically taken in charge by a robot. As illustrated in FIGS. 5C1, 5D1, the robot is able to convey the second solidified element to an evacuation station from where it can be evacuated. Simultaneously the second mould 44 can be re-closed to allow a further injection of material.

The method may comprise a third step of assembling together 314 the first element 41 and the second element 44. Said step is typically illustrated in FIG. 5D1.

Therefore, dissymmetrical parts can be simultaneously produced and matched without further handling or storage.

A further advantage of the method is the strict production in parity of different parts intended to be assembled together, with a minimum number of handling or storage steps.

In particular, a portion of the second mould, typically the second portion 432, is movable and secured to the second mould portion of the mould 40 of the first element 41. It is therefore possible for these two portions belonging to different moulds to be moved together, typically by rotation. It is thus possible to further simplify the tooling required to carry out the method.

Material

The method and system described above can be configured to allow the production of parts using different types of materials and production techniques.

Thermoplastic Material

The polymer is a thermoplastic material for example or mixture of thermoplastic materials, the solidification of the first part is performed by cooling the material.

Polymer parts obtained from an injected and solidified thermoplastic material, typically a thermoplastic polymer e.g. for medical or pharmaceutical use, are easily produced using the above-described method and system.

Injection is particularly performed under heat, typically under pressure, the injected thermoplastic being in the molten state. The mould is typically a cooled metal mould. Injection is typically performed under pressure.

Solidification is particularly obtained by cooling in the mould.

The cooling time is typically a function of the thickness of the part. Cooling time is dependent for example on the square of thickness using the formula:

$$t=e^2/a$$

where "e" is the characteristic thickness of the part, and "a" is diffusivity or thermal conductivity. This results from the low thermal conductivity of thermoplastic materials.

The temperature of the injection cavity is typically regulated, for example maintained below the melt temperature of the material.

Similarly, the temperature of the solidification cavity is typically regulated.

Thermosetting Material

The material is a thermosetting material for example, the solidification of the first part is performed by applying energy to the material, typically by heating.

A thermosetting material is typically composed of different ingredients. A thermosetting material typically comprises linear polymers adapted to allow solidification via cross-linking. Alternatively, or in addition, a thermosetting material typically comprises monomers adapted to allow solidification via polymerisation and to form a three-dimensional structure. Solidification, polymerisation and/or cross-linking take place under the effect of applied energy, typically by heating.

The injection of thermosetting material into the mould is typically obtained by cold injection of the mixed constituents in the liquid state, into a hot mould in which the cross-linking chemical reaction takes place.

The polymer parts obtained from an injected, solidified thermosetting material e.g. for medical or pharmaceutical use, can be easily produced using the method and system described above.

Injection is typically performed under cold conditions and typically under pressure with the plastic material in the liquid state in a heated mould. The mould is typically a metal mould. Injection is typically performed under pressure.

Solidification is particularly obtained by cross-linking in the heated mould, typically via the formation of three-dimensional polymer networks. Cross-linking time is dependent on thickness on account of the low thermal conductivity of thermosetting materials, the energy allowing cross-linking typically being applied to the surface of the part in contact with the mould.

The temperature of the injection cavity is typically regulated, for example held at cross-linking temperature.

Similarly the temperature in the solidification cavity is typically regulated.

The parts made from thermosetting material can typically undergo a post-baking operation. This operation allows completion of cross-linking for example.

This post-baking operation can be performed in the mould for example, in the solidification cavity e.g. during the solidification step.

Said post-treatment conducted during the solidification step in the solidification cavity is particularly advantageous compared to performing thereof in the injection cavity, since it is therefore possible to start the production of another part via injection. This is also advantageous compared with the transfer of parts into a separate chamber where the parts would be subjected to baking in bulk. It is therefore possible to limit the handling of the parts and also to avoid additional steps such as a step for unit redistribution of the parts after bulk baking for assembly thereof with other components.

Typology of Parts

Number of Components

Plastic parts intended to be produced using the above-described method and/or system are typically composed of at least two elements.

Two Elements

Plastic parts intended to be produced using the above-described method and/or system are composed of two elements for example.

These parts may comprise a thin element having a general thickness considered to be thin e.g. between 0.50 mm and 1.50 mm, for example between 0.75 mm and 1.25 mm, for example in the order of 1 mm.

In addition, these parts may comprise a thick element having a general thickness considered to be thick relative to the thin thickness, for example between 0.75 mm and 3 mm, for example between 1 mm and 2 mm, for example in the order of 1.5 mm.

The two elements can be made from same or different materials.

Three Elements

Plastic parts intended to be produced using the above-described method and/or system are composed of three elements for example e.g. of increasing thickness.

These parts may therefore comprise a first thin element having a general thickness considered to be thin e.g. between 0.50 mm and 1.50 mm, for example between 0.75 mm and 1.25 mm, for example in the order of 1 mm.

In addition, these parts may comprise a second thicker element having a general thickness considered to be thicker relative to the thin thickness, e.g. between 0.75 mm and 2 mm, for example between 1 mm and 1.75 mm, for example in the order of 1.4 mm.

These parts may also comprise a third even thicker element having a general thickness considered to be thicker relative to the thickness of the second element, e.g. between 1 mm and 3 mm, for example between 1.5 mm and 2.5 mm, for example in the order of 2 mm.

Sizing as a Function of Solidification Time

The typology of the elements intended to be produced and assembled using the method and/or system described above is typically determined by the solidification time i.e. the cooling or cross-linking time of each of the elements. This time is dependent on the thickness and the material used.

The solidification time of an element must be in the order of twice that of the next thinnest element for example, and hence typically four times that of the even thinner element.

By solidification time is meant the time needed to dwell in a solidification cavity to allow sufficient solidification for transfer and assembly of the element.

Therefore according to one example involving thermoplastic materials, the thickest element is considered to have a thickness $e_2$ with a cooling time $t_2$, and a thinner element to have a thickness $e_1$ with a cooling time $t_1$, the elements being produced and assembled in parity. The two elements are preferably sized to verify the rule that $2 \cdot t_1 = t_2$. Thereafter, by estimating the cooling time of the elements using the equation $t=e^2/a$ and assuming that the thermal diffusivity of the plastic materials is substantially the same, the thickness of the thickest part will be $e_2 = \sqrt{2} \cdot e_1$, i.e. $e_2 = 1.4 \cdot e_1$.

Similarly for the case when there are three elements of increasing thickness $e_1$ $e_2$ and $e_3$, these elements are preferably sized to verify that $4 \cdot t_1 = 2 \cdot t_2 = t_1$ with the thicknesses $e_3 = \sqrt{2} \cdot e_2 = \sqrt{2}\sqrt{2} \cdot e_1$ or else $e_3 = \sqrt{2} \cdot e_2 = 2 \cdot e_1$.

Said rule is applied with tolerance for example, either regarding the thicknesses (±50%) or the cycle times (±50%).

When taking into consideration the thicknesses of the parts, solely the thickest part of each part is typically taken into account to apply this rule, which allows the recourse to geometrically dissymmetrical parts.

Concerning thermal conductivity, the above rule can be fine-adjusted as a function of the type of materials used and the polymers it is sought to obtain, for example the conductivity of crystalline polymer is higher than the conductivity of an amorphous polymer.

Materials

As previously indicated, a part or element of a part produced using the method and/or system described above comprises a polymer material obtained for example from a thermoplastic material, the polymer material being amorphous i.e. having a non-organized structure such as PS, PMMA, PC, SEBS, or crystalline i.e. having an organized structure in which the chains are partly aligned such as PP or PE for example.

As indicated previously, a part of element of a part produced using the method and/or system described above comprises at least a polymer material obtained for example from a thermosetting material, in particular one or more elastomers of SI, IIR, IR, NR, NBR type, etc.

The cooling rate of thermoplastic materials is generally faster than the cross-linking rate of thermosetting materials or materials allowing elastomers to be obtained, however the proposed method is adapted to the different materials. For example, advantageously, a part may comprise one element in a thermoplastic polymer and another element in a thermoplastic elastomer or obtained from a thermoplastic material of SEBS, SEPS, EPDM type having a longer cooling time, irrespective of the geometry of the parts. It is also possible to associate a thermoplastic polymer or obtained from a thermoplastic material of thin thickness, hence having a rapid cooling time, with an elastomer obtained from a thermosetting material having a long cross-linking time.

Geometry

The method and/or system described above are particularly adapted for the production of elements of different geometries for subsequent association.

The elements intended to be associated typically have a small average thickness and a maximum thickness, for the thickest element in the order of 1.5 to 4 times thicker than the thickness of the thinnest element for two-element parts, in the order of 1.5 to 3.0 times thicker than the thickness of the next thinner element for parts with three of more elements.

Figure 6A:
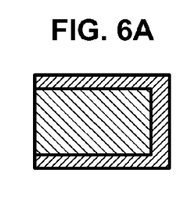
FIGS. 6A to 6N schematically illustrate different shapes of parts able to be produced by a method according to another example of embodiment of the invention.
Figure 6B:
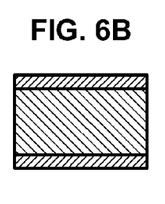
Figure 6C:
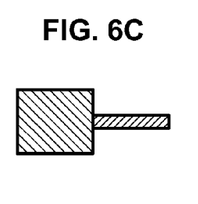
Figure 6D:
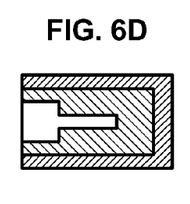
Figure 6E:
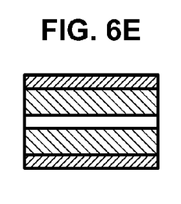
Figure 6F:
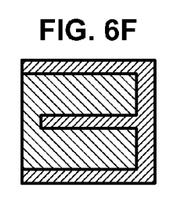
Figure 6G:
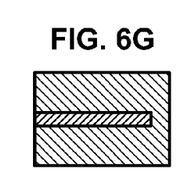
Figure 6H:
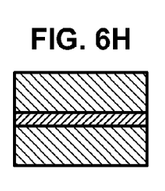
Figure 6I:
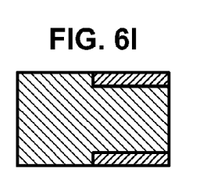
Figure 6J:
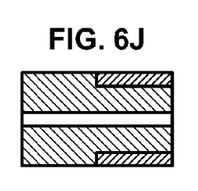
Figure 6K:
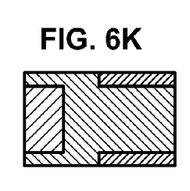
Figure 6L:
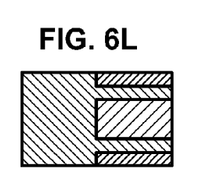
Figure 6M:
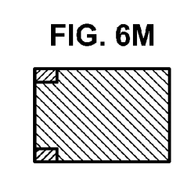
Figure 6N:
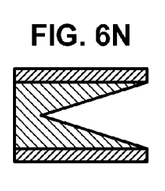

FIGS. 6A to 6N illustrate cross-sectional views of examples of parts composed of two or three elements assembled together, and able to be produced using the method and/or system described above.

These parts typically have cylindrical symmetry. Alternatively the parts may be of cylindrical shape with polygonal base, typically a rectangular base, typically a square base.

For two elements, the thickness ratio is between 1.5 and 4 times.

For three elements, the thickness ratio is between 1.5 and 3.0 between the thinnest part and the intermediate part, and the ratio is the same between the intermediate part and the thickest part.

Utilisation of Parts

As indicated above, the method is particularly adapted for parts intended for the pharmaceutical and medical sectors.

In particular, in the pharmaceutical and medical fields the parts must be produced under controlled, regulated environment conditions first to obtain control over contamination of the parts in terms of particles, but also control over contamination of the parts in microbiological terms as estimated by "bioburden", i.e. bacterial contamination or initial bioburden before sterilization.

The "bioburden" of parts increases in proportion to the number of handling operations and exposure time to the outside environment.

It is therefore necessary to limit the exposure time of the parts and the number of handling operations throughout production of the parts.

In particular, in the pharmaceutical field the critical steps and different factors determining initial contamination of the parts produced are dependent on human presence, the extent of automation, the number of production and storage steps and the quality of environment control.

The above-described method and system are particularly advantageous in this respect since they allow automation limiting human presence, limitation of the number of production steps and limitation even non-existence of intermediate storage.

The parts can also be used in the following sectors: cosmetic (e.g. for caps or toothbrushes), food (e.g. lids), automobile (e.g. combination switches), mass market products (e.g. pens).

DETAILED EXAMPLES

First Example

FIGS. 4A1 to 4D2 illustrate an example of a method for producing a part formed of two elements.

The part is a protective sheath for needles routinely used in the pharmaceutical field, in particular for syringes prefilled with medication and intended to be incorporated for example in drug auto-injectors.

The part is typically composed of two elements. The first element 41 is an element in elastomer for example typically of cylindrical shape comprising an inner conical part intended to receive the needle. The second element 44 is typically a tubular part in rigid plastic covering the first element 41 and intended to rigidify this same more flexible first element 41.

The two elements are typically produced in equal quantities since they are intended to be assembled together in strict parity.

The first element 41 typically forms an inner part in elastomer and may comprise thicker parts typically in the order of 2.5 mm. The second element 44 typically forms a rigid tubular part which may be of general thinner, homogeneous thickness typically in the order of 1.0 mm.

For this example, the second element 44 is typically produced on a standard single-material injection machine equipped with a sixteen-cavity mould, whilst the first element 41 is typically produced on a standard single-material injection machine equipped with a rotating 2×16 cavity mould of which sixteen cavities are intended for injection properly so-called and for initial solidification, in particular for cooling to a temperature and state of surface solidification enabling the first elements to be transferred, and sixteen cavities intended solely for solidification, typically for completion of solidification and in particular for cooling.

As illustrated in FIGS. 4A1 and 4A2, the first element 41 and the second element 44 are typically formed by injection simultaneously according to steps 204 and 304 described above. The injections are typically made into sixteen first injection cavities 403 for the first elements and into sixteen injection cavities 433 for the second elements.

As illustrated in FIGS. 4B1 and 4B2, a first solidification can then take place. After this step, the second elements 44 are typically fully rigidified, whilst the first elements 41 have typically cooled sufficiently for handling.

As illustrated in FIGS. 4C1 and 4C2, the second elements 44 are then typically ejected at step 312, for example at the same time as first elements 41 possibly derived from a preceding production cycle.

Also, the first elements 41 sufficiently cooled so that they can be handled are typically transferred moved on the second mould portion 402 for example by rotation of the second mould portion 402 for continued cooling.

Figure 4D:
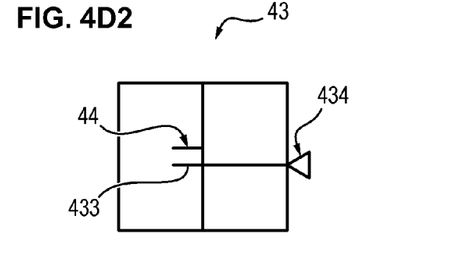

As illustrated in FIGS. 4D1 and 4D2, thereafter a new set of sixteen first elements 41 and a new set of sixteen second elements 44 are typically injected simultaneously.

Initial solidification can then typically be carried out for the first elements 41 which have just been injected. Complete solidification of the second elements 44 can take place at the same time.

The second solidified elements 44 are then typically again ejected whilst the first elements 41 having completed initial solidification are typically moved into the solidification cavities 407 of the mould to continue their solidification, and the first elements 41 derived from the preceding injection and having completed their solidification cycle are typically also ejected.

Therefore, on each ejection of the sixteen second elements 44, sixteen first elements 41 having required a solidification time about twice longer can also be ejected.

The first elements and second elements can typically be assembled together at step 314, in equal parts, on each production cycle of the second elements 44, without any additional handling or storage, thereby limiting risks of mixing between parts, of increasing initial contamination and packaging costs.

Second Example

FIGS. 5A1 to 5E2 illustrate another example of a method for producing a part formed of two elements.

The parts also form a needle protection for example.

This example differs from the preceding example in that the solidification time of the first element 41 is typically substantially equal to three times the solidification time of the second element 44 intended to be assembled in parity with the first element 41.

The second element 44 is typically produced on a second mould 43 having n injection cavities, "n" being a positive integer, the first element 41 then typically being produced on a mould 40 of which the second mould portion 402 comprises 3×n ejection zones 4021, 4022 and 4023.

The first element 41 and the second element 44 are produced for example on injection moulding machines.

The machines are typically associated in tandem during production time, the produced first elements 41 and second elements 44 typically being immediately assembled together e.g. at an assembly station.

This assembling is typically performed without any particular handling such as placing in storage, redistribution or further operation. It is therefore possible to maintain minimum initial contamination and to avoid any risk of mixing between parts.

For example as illustrated in FIGS. 5A1 and 5A2, a second mould portion 402 comprises three ejection zones A, B and C.

Typically throughout a first cycle, a second element 44 is produced by injection, whilst the first element 41 in zone C is ejected, the element placed in zone C is solidified in a solidification cavity and the element in zone A is injected.

Typically, as illustrated in FIGS. 5B1 and 5B2, throughout a second cycle, the second element 44 is solidified whilst the first elements 41 placed in zones A and B are solidified.

Typically, as illustrated in FIGS. 5C1 and 5C2, throughout a third cycle the second element 44 is ejected from the second mould 43 and the second mould portion 402 is moved, typically via rotation, enabling the first element 41 in zone A to continue its solidification in the space occupied by zone B during the preceding cycle, and enabling the first element 41 in zone B to continue its solidification in the space occupied by zone C during the preceding cycle.

Typically, as illustrated in FIGS. 5D1 and 5D2, throughout a fourth cycle, the second element 44 derived from the preceding cycle joins up with a second element ejected from zone C before the first cycle, and awaiting assembly, whilst a new second element 44 is injected into the second mould and a new first element is injected into zone C which occupies the same place as zone A at the preceding injection, and the solidification of the first elements 41 placed in zones A and B is continued.

Figure 5E:
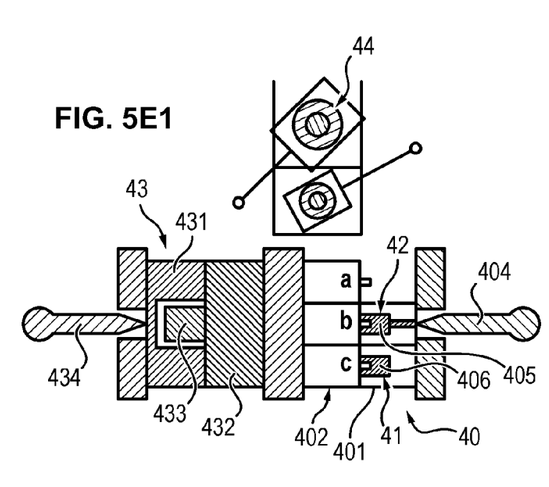
Figure 5E:
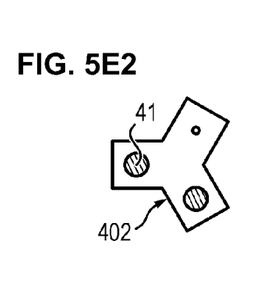

Typically, as illustrated in FIGS. 5E1 and 5E2, throughout a fifth cycle the second element 44 completes its solidification before ejection and the first element placed at zone B is ejected.

The invention claimed is:

1. A method for producing parts formed of at least a first part and a second part, wherein the method comprises:
producing first polymer parts in a first mould comprising a first mould portion and a second mould portion movable relative to one another, comprising the steps of:
closing the first mould in a first position in which the first and second mould portions form at least a first injection cavity connected via the first mould portion to a first material injection device,
injecting material into the first injection cavity to form a first first part,
moving one of the first and second mould portions relative to the other, the first first part remaining connected to the second mould portion,
closing the first mould in a second position, in which the first and second portions form:
at least a second injection cavity connected via the first mould portion to the first material injection device, and
a first solidification cavity in which the first first part is placed,
injecting material into the second injection cavity to form a second first part in the second injection cavity and simultaneously solidifying the first first part placed in the first solidification cavity; and
simultaneously, producing second polymer parts in a second mould comprising:
a third mould portion and a fourth mould portion movable relative to one another, the second part having a shorter solidification time than the first part, comprising the steps of:
closing the second mould in a third position in which the third and fourth mould portions form at least a third injection cavity connected via the third mould portion to a second material injection device;

simultaneously to injecting material into the second injection cavity to form a second first part in the second injection cavity, injecting material into the third injection cavity to form a second part and solidification of the second part in the third injection cavity;

moving one of the third and fourth mould portions relative to the other, the second part remaining connected to the fourth mould portion;

and subsequently assembling the first first part and the second part.

2. The method according to claim 1, wherein the material is:
   a thermoplastic material, the solidification of the first part is performed by cooling the material, or
   a thermosetting material, the solidification of the first part is performed by applying energy to the material by heating.

3. The method according to claim 1, wherein the first part is produced by a single-material injection moulding machine.

4. The method according to claim 1, further comprising the step of ejecting the first first solidified part.

5. The method according to claim 1, wherein a portion of the second mould is movable and secured to the second mould portion so that the portion of the second mould and the second mould portion are moved together.

6. The method according to claim 1, wherein the thicker part among the first and second parts has a maximum thickness of 1.5 to 4 times thicker than the thickness of the thinner part.

7. The method according to claim 1, wherein the first and second parts are in thermoplastic materials and comprise a thicker part and a thinner part, the thickness $e_2$ of the thicker part being defined by:

$$e_2 = \sqrt{2} \cdot e_1$$

where $e_1$ is the thickness of the thinner part, so that the cooling time of the thicker part is twice the cooling time of the thinner part.

8. The method according to claim 1, wherein the part is formed of at least three parts, and the thickest part has a maximum thickness in the order of 1.5 to 3.0 times thicker than the thickness of the next thinner part.

9. The method of claim 1, wherein:
   producing first polymer parts includes ejecting the first first solidified part, and
   producing second polymer parts includes ejecting the second solidified part.

10. The method according to claim 1, wherein the first mould portion comprises at least one injection zone and at least one solidification zone, and the second mould portion comprises a first ejection zone and a second ejection zone, so that:
   in the first position:
      the injection zone and the first ejection zone form the first injection cavity, and
      the solidification zone and the second ejection zone form a second solidification cavity, or the second ejection zone is positioned so as to allow ejection of a solidified part connected to the second ejection zone,
   in the second position:
      the injection zone and the second ejection zone form the second injection cavity, and
      the solidification zone and the first ejection zone form the first solidification cavity.

11. The method according to claim 10, wherein the relative movement of the first and second mould portions comprises a rotation so as to move the first ejection zone in front of the solidification zone and the second ejection zone in front of the injection zone.

12. The method according to claim 10, wherein the first mould portion comprises a plurality of injection zones including the at least one injection zone and a plurality of solidification zones including the at least one solidification zone, and the second mould portion comprises a plurality of ejection zones including the first ejection zone and the second ejection zone.

13. The method according to claim 1, wherein the thinner part among the first and second parts has a thickness of between 0.50 mm and 1.50 mm, and the thicker part has a thickness of between 0.75 mm and 3 mm.

14. The method of claim 13, wherein the thinner part among the first and second parts has a thickness of between 0.75 mm and 1.25 mm.

15. The method of claim 14, wherein the thinner part among the first and second parts has a thickness in the order of 1 mm.

16. The method of claim 13, the thickest part has a thickness of between 1 mm and 2 mm.

17. The method of claim 16, wherein the thickest part has a thickness in the order of 1.5 mm.

18. A method for producing parts formed of at least a first part and a second part, wherein the method comprises:
   producing first polymer parts in a first mould comprising a first mould portion and a second mould portion movable relative to one another, comprising:
      a first cycle of steps of:
         closing the first mould in a first position in which the first and second mould portions form at least a first injection cavity connected via the first mould portion to a first material injection device,
         injecting material into the first injection cavity to form a first first part,
         moving one of the first and second mould portions relative to the other, the first first part remaining connected to the second mould portion,
      a subsequent second cycle of steps of:
         closing the first mould in a second position, in which the first and second portions form:
            at least a second injection cavity connected via the first mould portion to the first material injection device, and
            a first solidification cavity in which the first first part is placed,
         injecting material into the second injection cavity to form a second first part in the second injection cavity and simultaneously solidifying the first first part placed in the first solidification cavity,
   simultaneously to the second cycle of steps, producing second polymer parts in a second mould comprising a third mould portion and a fourth mould portion movable relative to one another, the second part having a shorter solidification time than the first part, comprising the steps of:
      closing the second mould in a third position in which the second mould forms at least a third injection cavity connected via the third mould portion to a second material injection device,
      injecting material into the at least third injection cavity to form a second part and solidification of the second part in the at least third injection cavity, moving one of the third and fourth mould portions relative to the other, the second part remaining connected to the fourth mould portion, subsequently assembling the first first part and the second part.

* * * * *